UNITED STATES PATENT OFFICE.

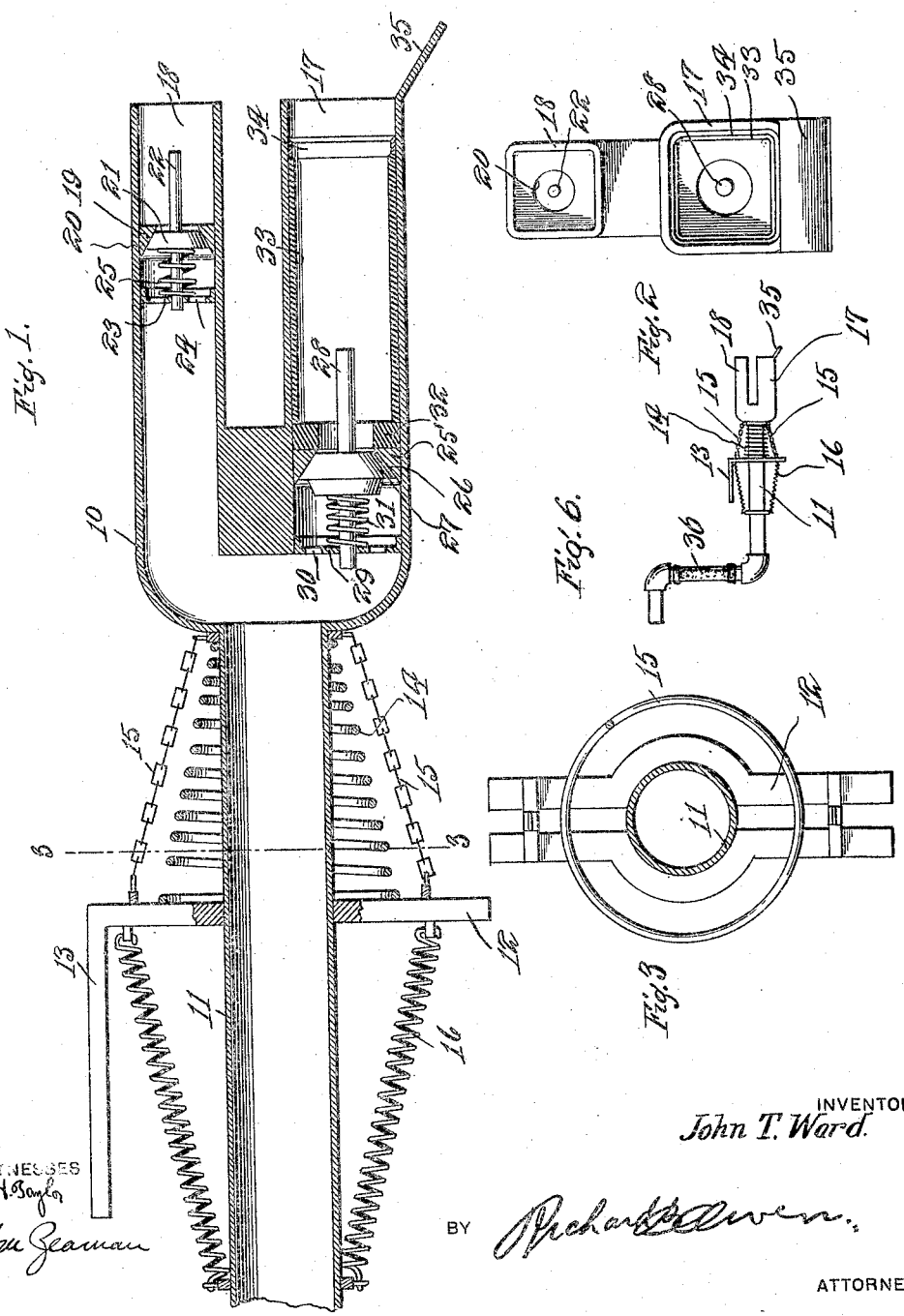

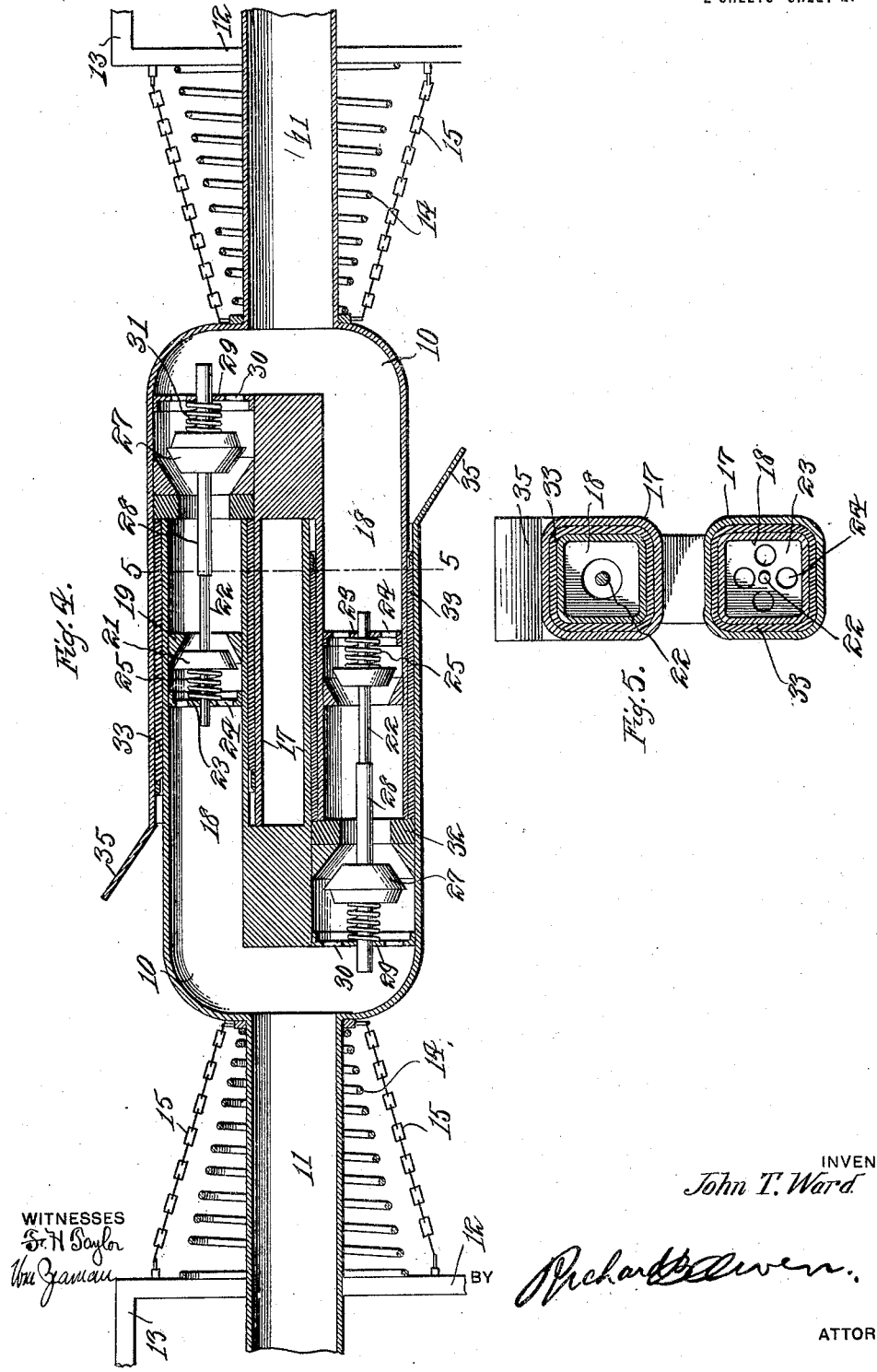

JOHN T. WARD, OF HARDIN, KENTUCKY.

AUTOMATIC HOSE-COUPLING.

1,276,138.   Specification of Letters Patent.   Patented Aug. 20, 1918.

Application filed August 24, 1917. Serial No. 188,000.

*To all whom it may concern:*

Be it known that I, JOHN T. WARD, a citizen of the United States, residing at Hardin, in the county of Marshall and State of Kentucky, have invented certain new and useful Improvements in Automatic Hose-Couplings, of which the following is a specification.

This invention has relation to railway car appliances, and has for an object to provide an automatic air hose coupling comprising complemental members, each of which is adapted to be positioned upon the end of a railway car whereby the train line of each car may be placed in mutual communication when the coupling members are brought together in the manner hereinafter set forth.

Another object of the invention is to provide means in an automatic air hose coupling for normally retaining the complemental coupling members in engagement and to prevent relative disconnection or separation of the members due to relative movement of the car truck.

In addition to the foregoing my invention comprehends improvements in the details of construction and arrangement of parts to be hereinafter more fully described and particularly set forth in the appended claim.

In the accompanying drawings in which similar and corresponding parts are designated by the same characters of reference throughout the several views in which they appear:

Figure 1, is a view in longitudinal vertical section of one member of an automatic air hose coupling constructed after the manner of my invention.

Fig. 2, is an end view of one of the members.

Fig. 3, is a transverse sectional view taken on the line 3—3 of Fig. 1.

Fig. 4, is a view in longitudinal vertical section of a pair of complemental members of my improved air hose coupling illustrating the same in mutual interengagement, and Fig. 5, is a detail section taken on the line 5—5 of the preceding figure.

Fig. 6 is a side elevation of my improved air hose coupling.

With reference to the drawings 10 indicates generally one coupling head or complemental member of my improved air hose coupling which is hollow and is formed with a tubular member 11 which is adapted to be placed in communication with the train pipe of the car upon which the coupling head is mounted. The tubular member 11 is slidably mounted in the depending portion 12 of a bracket having a horizontal portion 13 whereby the bracket may be secured to the under side of a beam or the like forming a part of the car truck. A conical and helical spring 14 is interposed between the coupling head 10 and the depending portion 12 of the bracket mentioned above whereby to normally urge the coupling head forward, such movement of the coupling head being limited through the provision of chains 15 which connect the coupling heads with the supporting bracket therefore substantially in the manner shown in Figs. 1 and 2 of the drawings. A pair of tensional springs 16 are also provided and located on the side of the depending portion 12 of the bracket opposite that to which the chains 15 are connected, said springs 16 being connected at one of their ends to the bracket and at their opposite ends to the tubular member 11 whereby to urge, in connection with the spring 14 the coupling head toward a forward position.

Each coupling head 10 is provided with a pair of parallel forwardly extending tubular extensions 17 and 18, the member 17 being larger in diameter than the member 18. The tubular 17 will hereinafter be termed the receptive and the tubular member 18 the penetrative member.

The tubular member 18 is formed with an annular shoulder 19 therein which is formed with a conical opening 20 forming a valve seat for a conical valve 21. Said valve is provided with a valve stem 22 projecting at either side thereof, the portion of the valve stem projecting toward the coupling head being guided for movement in a diaphragm 23 provided with a series of perforations 24. A spring 25 is interposed between said diaphragm and the valve to normally retain the valve upon its seat. It is to be noted that the valve stem 22 at the opposite side of the conical valve projects well forward toward the terminal of the tubular member 18 in which it is mounted.

The receptive tubular member 17 is likewise formed adjacent its point of connection with the main body portion of the coupling head with an annular shoulder 25' which is likewise formed with a central conical opening 26 in which is movably mounted a valve 27. The valve 27 is likewise provided with a stem 28 which extends through the valve and projects at opposite sides thereof with the rear end of the stem seated or guided for movement in a diaphragm 29 having perforations 30. A coil spring 31 is similarly interposed between the diaphragm 29 and the valve 27 to normally retain the valve against its seat.

An annular gasket or abutment member 32 is provided within the receptive member 17 and bears against the shoulder 25' with a perforation through which the valve stem 28 projects. The gasket 32 is preferably made of rubber or other yielding material and is relatively thick to form a cushion member in a manner which will be presently noted. The interior of the receptive or tubular member 17 is likewise provided with a lining of rubber or the like 33 to form an airtight connection with the penetrative member of the complemental coupling member when said coupling members are brought into engagement. The outer terminal of the tubular lining 33 may be reduced as at 34 to facilitate the entrance of the penetrative member of the complemental coupling. Each receptive tubular member 17 is likewise formed with an outwardly flaring portion 35 to form a guide.

It is to be remembered that the complete air hose coupling includes two members of complemental construction adapted for interengagement one member being mounted upon each end of a car whereby when the two cars are brought together the coupling heads thereon are interengaged, and to that end the coupling heads must be arranged so that the penetrative member 18 of one will be in a position to enter the receptive member 17 of the other.

To proceed, when the complemental members of my improved air hose coupling are brought together the penetrative member 18 of one is engaged upon the flared guide 35 of the receptive member of the other complemental head and when the coupling heads are brought together the tubular members are telescoped one within another in a manner set forth in Fig. 4 of the drawings. It will be noted in this connection that the penetrative member 18 of one coupling is engaged within the lining 33 of the receptive member of the opposite coupling head and furthermore said penetrative member abuts at its terminal against the gasket 32, forming in connection with the above mentioned lining 33 an airtight connection to preclude the escape of air. It will also be noted that when the members are moved to furthermost interengaging position, the valve stem 22 within the penetrative member of one coupling head will abut against the valve stem 28 of the receptive member of the opposite coupling head whereby said valves 21 and 27 respectively are dislodged from their seats against the tension of their respective springs to establish communication between the tubular members 11 of each coupling head thereby forming in effect a practically continuous train line. When the penetrative member of one coupling head abuts against the gasket 32 of another, further movement of the connected cars toward each other will permit the springs 16 and 14 to give, thereby preventing injury to the hose coupling. Any movement of the cars toward separation will cause the said springs to urge the coupling heads forward to continue and maintain engagement therebetween. It will furthermore be noted that movement of each coupling head relative to the train pipe is permitted through the provision of the elbow connection between each tubular member 11 and its associated train line, a short section of rubber tubing or the like 36 being interposed in said elbow to permit such relative movement, as set forth in Fig. 6 of the drawings.

The penetrative and receptive tubular members 17 and 18 of each coupling head are herein illustrated as rectangular in cross section, although it is to be understood that they may be made circular in cross section if desired.

While I have illustrated and described my invention with some degree of particularity, I realize that in practice various alterations thereover may be made, and I therefore reserve the right and privilege of changing the form of the details of construction, or otherwise altering the arrangement of the correlated parts without departing from the spirit of the invention or the scope of the appended claim.

Having thus described by invention what I claim as new and desire to secure by Letters Patent is:—

A coupling head including a substantially U-shaped tubular body member defining parallel tubular arms of different diameters, a tubular member connected to the intermediate portion thereof, a pair of conical valves, one in each tubular member, oppositely extending valve stems on said valve members, a pair of cages, one in each tubular member to receive one of the valve stems, springs interposed between said cages and valve, valve seats, and a relatively long tubular gasket inserted in the wider tubular member having a thickened end wall formed with an aperture to receive the valve stem of the valve therein and having its other end beveled inwardly and reduced to receive the smaller tubular portion of an adjacent coupling head.

In testimony whereof I affix my signature in presence of two witnesses.

JOHN T. WARD.

Witnesses:
B. L. TREVATHAN,
D. E. BORKER.

Copies of this patent may be obtained for five cents each, by addressing the "Commissioner of Patents, Washington, D. C."